US010150216B2

(12) United States Patent
Sun et al.

(10) Patent No.: US 10,150,216 B2
(45) Date of Patent: Dec. 11, 2018

(54) ROBOT CLEANER

(71) Applicant: LG Electronics Inc., Seoul (KR)

(72) Inventors: Changhwa Sun, Seoul (KR);
Dongmyung Shin, Seoul (KR);
Sungjin Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 602 days.

(21) Appl. No.: 14/196,294

(22) Filed: Mar. 4, 2014

(65) Prior Publication Data
US 2014/0257565 A1    Sep. 11, 2014

(30) Foreign Application Priority Data

Mar. 5, 2013  (KR) .................. 10-2013-0023568

(51) Int. Cl.
*B25J 9/16* (2006.01)
*G05D 1/02* (2006.01)
*G01S 17/42* (2006.01)
*G01S 17/48* (2006.01)
*G01S 17/88* (2006.01)
*G01S 7/481* (2006.01)

(52) U.S. Cl.
CPC .......... *B25J 9/1694* (2013.01); *G01S 7/4811* (2013.01); *G01S 7/4813* (2013.01); *G01S 7/4817* (2013.01); *G01S 17/42* (2013.01); *G01S 17/48* (2013.01); *G01S 17/88* (2013.01); *G05D 1/0238* (2013.01); *G05D 2201/0203* (2013.01); *Y10S 901/01* (2013.01); *Y10S 901/30* (2013.01); *Y10S 901/47* (2013.01)

(58) Field of Classification Search
CPC .... Y10S 901/47; Y10S 901/01; Y10S 901/30; G05D 1/0238; G05D 2201/0203; G05D 1/0231–1/0253; B25J 9/1694; B25J 9/1697; A47L 2201/04; B60R 2300/101
USPC ........................................................ 15/319
See application file for complete search history.

(56) References Cited

U.S. PATENT DOCUMENTS 5,163,202 A * 11/1992 Kawakami ............ A47L 9/2815
15/319
5,995,884 A * 11/1999 Allen .................... G05D 1/0225
180/167

(Continued)

FOREIGN PATENT DOCUMENTS

AU    1532601 A    6/2001
CN    1955839 A    5/2007

(Continued)

OTHER PUBLICATIONS

Korean Office Action dated Mar. 20, 2014 Application No. 10-2013-0023568, with English Translation, 11 pages.

*Primary Examiner* — Christopher M Koehler
*Assistant Examiner* — Henry Hong
(74) *Attorney, Agent, or Firm* — Dentons US LLP

(57) ABSTRACT

A robot cleaner is disclosed. The robot cleaner includes a cleaner body, a position sensor disposed in the cleaner body, the position sensor including a light transmission unit to emit light and a light reception unit to receive light reflected or scattered from an obstacle after being emitted from the light transmission unit, and a transparent member to transmit the light emitted from the light transmission unit and the light to be received by the light reception unit.

13 Claims, 12 Drawing Sheets

(56) References Cited

U.S. PATENT DOCUMENTS

| | | | |
|---|---|---|---|
| 7,024,278 B2 | 4/2006 | Chiappetta | |
| 7,706,917 B1* | 4/2010 | Chiappetta | G05D 1/0225 |
| | | | 700/245 |
| 2005/0166354 A1* | 8/2005 | Uehigashi | A47L 9/2805 |
| | | | 15/319 |
| 2011/0278082 A1* | 11/2011 | Chung | G01S 7/4814 |
| | | | 180/167 |
| 2012/0197439 A1* | 8/2012 | Wang | B25J 9/1689 |
| | | | 700/259 |
| 2014/0130289 A1* | 5/2014 | Hyun | A47L 11/4036 |
| | | | 15/319 |
| 2014/0350839 A1* | 11/2014 | Pack | G01C 21/30 |
| | | | 701/409 |

FOREIGN PATENT DOCUMENTS

| | | |
|---|---|---|
| CN | 101049218 A | 10/2007 |
| CN | 101066198 A | 11/2007 |
| CN | 101204311 A | 6/2008 |
| CN | 102288969 A | 12/2011 |
| JP | 2009520562 A | 5/2009 |
| KR | 10-0738888 B1 | 7/2007 |
| KR | 10-2008-0093768 A | 10/2008 |
| KR | 10-2011-0124506 A | 11/2011 |
| KR | 10-2012-0016295 A | 2/2012 |
| WO | 0142867 A1 | 9/2001 |

\* cited by examiner (a) (b)

ROBOT CLEANER

CROSS-REFERENCE TO RELATED APPLICATION

This application claims the priority benefit of Korean Patent Application No. 10-2013-0023568, filed on Mar. 5, 2013, in the Korean Intellectual Property Office, the disclosure of which is incorporated herein by reference.

BACKGROUND OF THE INVENTION

1. Field of the Invention

The present invention relates to a robot cleaner.

2. Description of the Related Art

A robot cleaner is an appliance that suctions foreign matter, such as dust, from the floor of a zone to be cleaned so as to clean the zone while autonomously traveling in the zone without user manipulation.

Generally, such a robot cleaner detects the distance to an obstacle, such as furniture, office supplies, or walls, located in a zone to be cleaned and then maps the zone or controls driving of a left wheel and a right wheel to perform an operation of evading the obstacle. Such a robot cleaner is provided with a distance sensor to measure the distance to the obstacle. The distance sensor includes a light transmission unit to emit light toward the obstacle and a light reception unit to receive light reflected or scattered from the obstacle.

Conventionally, the light transmission unit and the light reception unit are exposed to the outside. As a result, dust generated during cleaning may contaminate a lens or an image sensor constituting the light transmission unit or the light reception unit. In a case in which the lens or the image sensor is contaminated by the dust, an error may be generated when measuring the distance to the obstacle and, in addition, durability of the lens or the image sensor may be deteriorated.

SUMMARY OF THE INVENTION

It is an object of the present invention to provide a robot cleaner that is capable of preventing a position sensor from being contaminated by a contaminant, such as dust, and more accurately measuring the distance to an obstacle.

In accordance with an aspect of the present invention, the above and other objects can be accomplished by the provision of a robot cleaner including a cleaner body, a position sensor disposed in the cleaner body, the position sensor including a light transmission unit to emit light and a light reception unit to receive light reflected or scattered from an obstacle after being emitted from the light transmission unit, and a transparent member to transmit the light emitted from the light transmission unit and the light to be received by the light reception unit.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Advantages and features of the present invention and a method of achieving the same will be more clearly understood from embodiments described below with reference to the accompanying drawings. However, the present invention is not limited to the following embodiments but may be implemented in various different forms. The embodiments are provided merely to complete disclosure of the present invention and to fully provide a person having ordinary skill in the art to which the present invention pertains with the category of the invention. The invention is defined only by the category of the claims. Wherever possible, the same reference numbers will be used throughout the specification to refer to the same or like parts.

Figure 1:
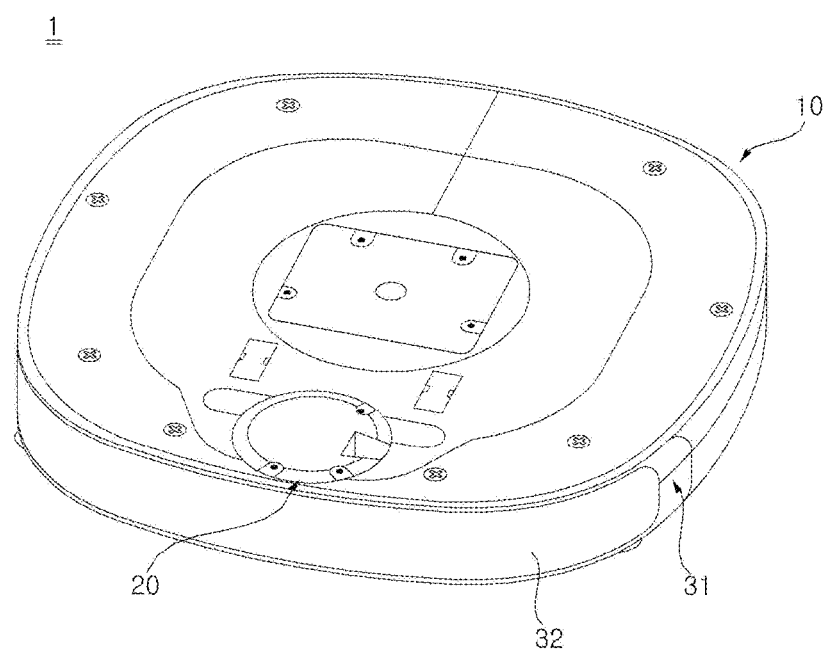
FIG. 1 is a perspective view showing a robot cleaner according to an embodiment of the present invention.
Figure 2:
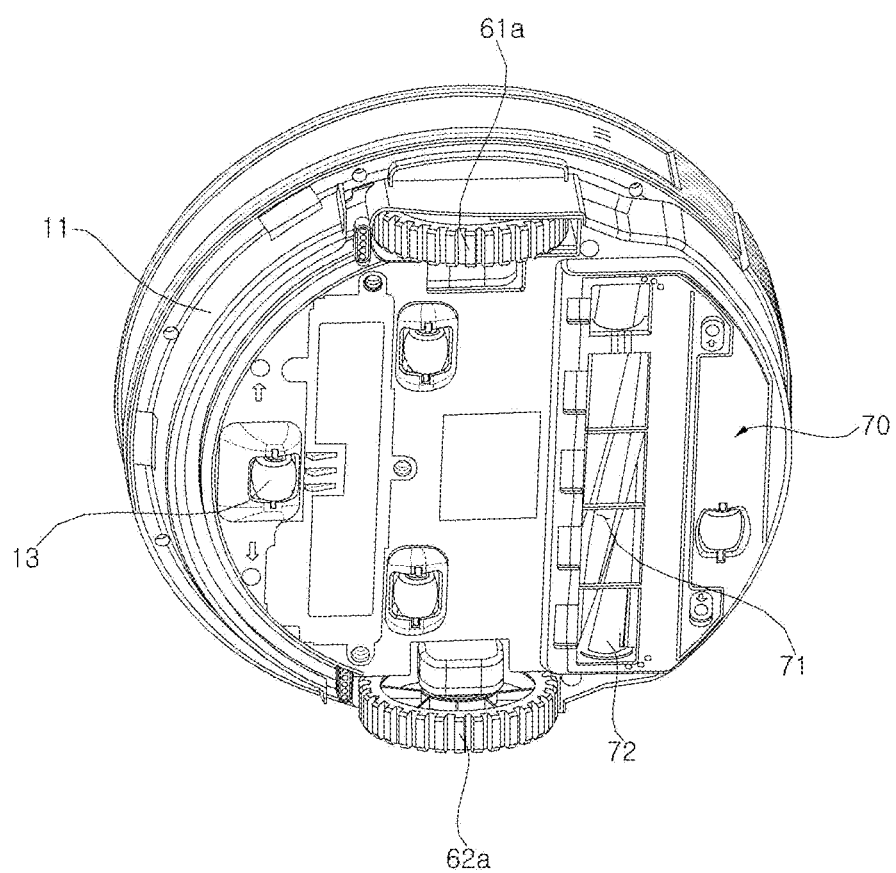
FIG. 2 is a view showing the bottom of the robot cleaner of FIG. 1.
Figure 3:
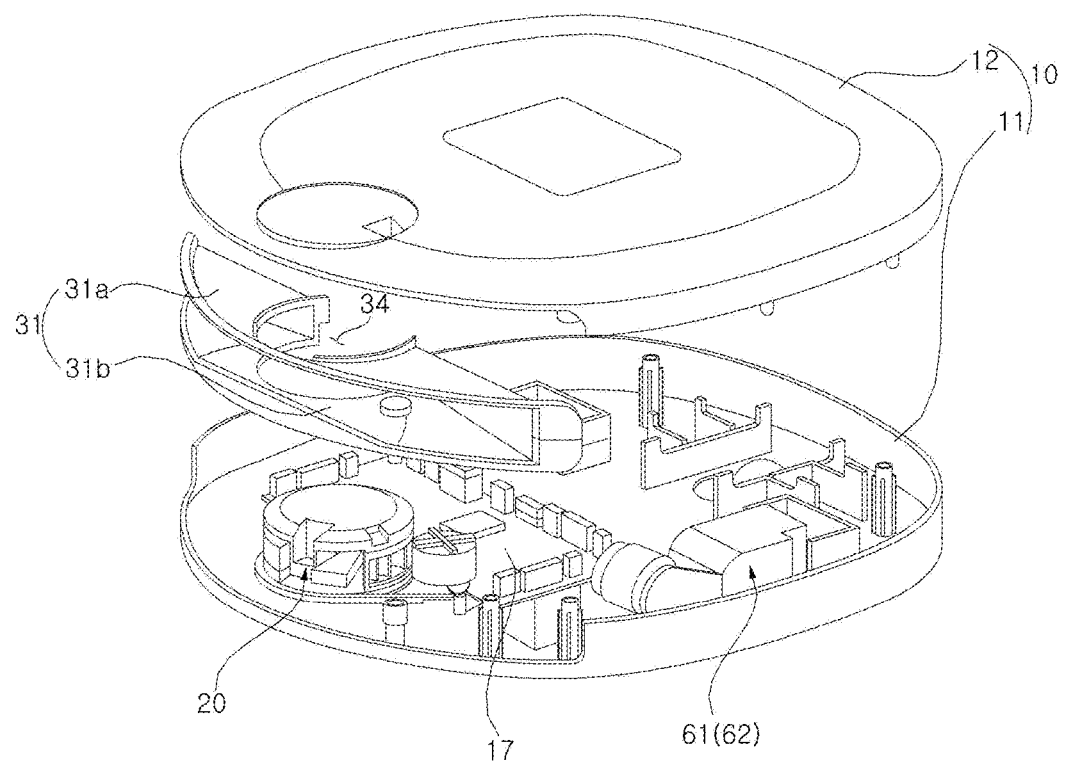
FIG. 3 is an exploded perspective view of the robot cleaner of FIG. 1.
Figure 4:
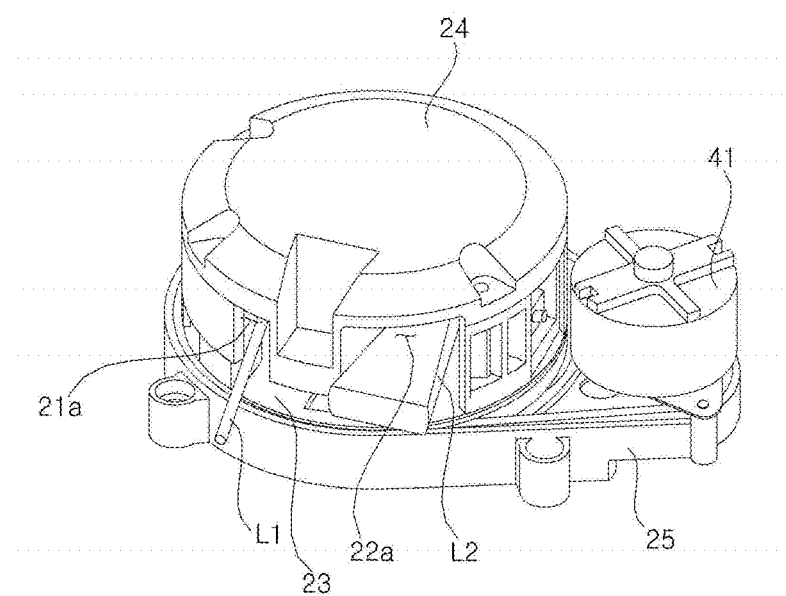
FIG. 4 is a view showing a position sensor of FIG. 3.
Figure 5:
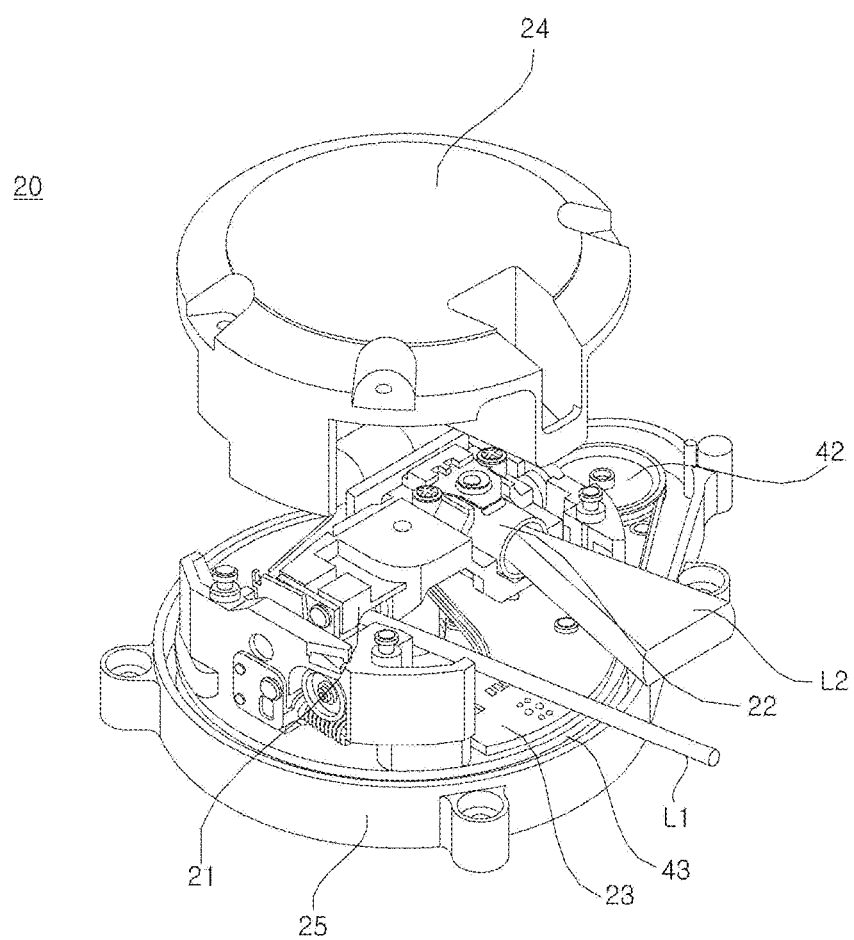
FIG. 5 is an exploded perspective view of the position sensor of FIG. 4.
Figure 6:
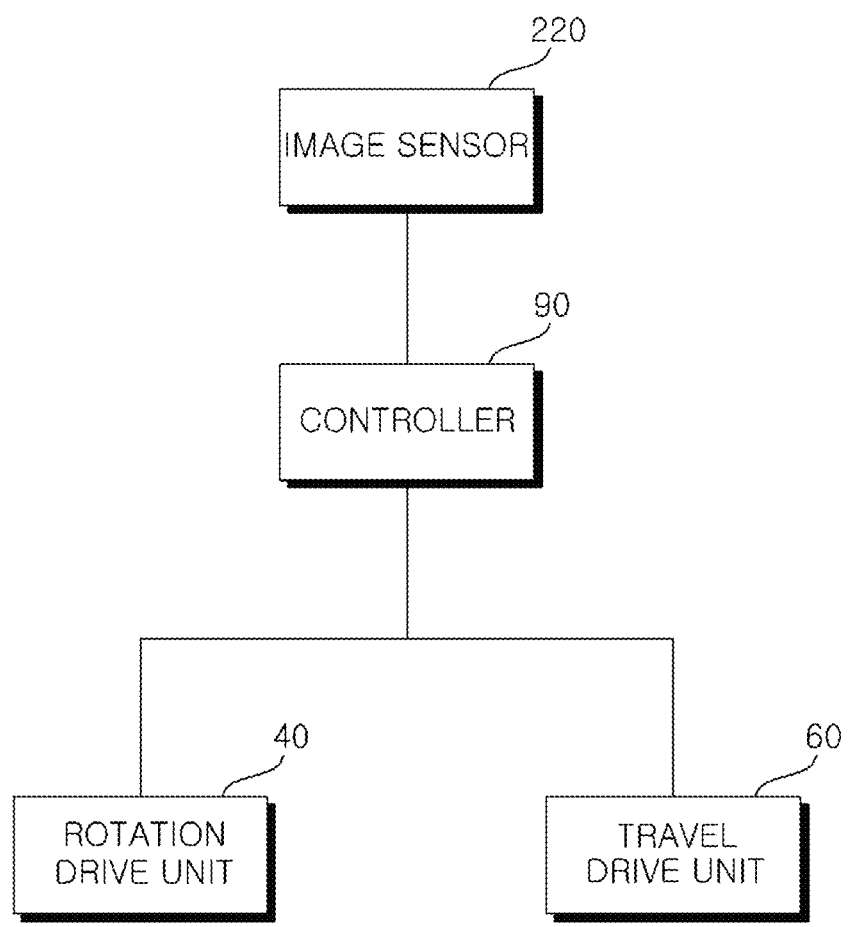
FIG. 6 is a perspective view showing control relationships among main components of the robot cleaner according to the embodiment of the present invention.

FIG. 1 is a perspective view showing a robot cleaner according to an embodiment of the present invention. FIG. 2 is a view showing the bottom of the robot cleaner of FIG. 1. FIG. 3 is an exploded perspective view of the robot cleaner of FIG. 1. FIG. 4 is a view showing a position sensor of FIG. 3. FIG. 5 is an exploded perspective view of the position sensor of FIG. 4. FIG. 6 is a perspective view showing control relationships among main components of the robot cleaner according to the embodiment of the present invention.

Referring to FIGS. 1 to 6, a robot cleaner 1 according to an embodiment of the present invention includes a cleaner body 10, a position sensor 20, and a transparent member 32.

The cleaner body 10 suctions foreign matter, such as dust or waste, from a zone to be cleaned (hereinafter, referred to as a cleaning zone) through a suction unit 70 while moving in the cleaning zone according to the rotation of a left wheel 61a and a right wheel 62a.

The suction unit 70 may include a suction fan 72 provided at the cleaner body 10 to generate suction force and a suction port 71 to allow an air current generated by the rotation of the suction fan 72 to be suctioned therethrough. In addition, the suction unit 70 may further include a filter (not shown) to collect foreign matter from the air current suctioned through the suction port 71 and a foreign matter container (not shown) to allow the foreign matter collected by the filter to accumulate therein.

The left wheel 61*a* and the right wheel 62*a* may be driven by a travel drive unit 60. The travel drive unit 60 may include a left wheel drive unit 61 to drive the left wheel 61*a* and a right wheel drive unit 62 to drive the right wheel 62*a* (In FIG. 3, reference numeral 62 indicates the right wheel drive unit provided at the opposite side to the left wheel drive unit 61). Operations of the left wheel drive unit 61 and the right wheel drive unit 62 may be independently controlled by a controller 90 such that the cleaner body 10 moves forward or backward or turns around. For example, when the left wheel 61*a* is rotated by the left wheel drive unit 61 in the forward direction and the right wheel 62*a* is rotated by the right wheel drive unit 62 in the reverse direction, the cleaner body 10 turns to the left or to the right. The controller 90 may control the left wheel drive unit 61 and the right wheel drive unit 62 such that the left wheel drive unit 61 and the right wheel drive unit 62 have different rotational speeds to guide translation of the cleaner body 10 including linear movement and turning movement. Consequently, the cleaner body 10 may evade or turn around an obstacle under control of the controller 90. At least one auxiliary wheel 13 to stably support the cleaner body 10 may be further provided.

The cleaner body 10 may include a lower cleaner body part 11, in which a rotation drive unit 40 and the travel drive unit 60 are disposed, and an upper cleaner body part 12 to cover the lower cleaner body part 11.

A light transmission unit 21 emits light. The light transmission unit 21 may include a light source and a collimate lens to collimate light (L1 of FIGS. 4 and 5) emitted from the light source. A light emitting body to emit infrared light or visible light, such as an infrared or visible light emitting diode (LED), may be used as the light source. In addition, a light emitting body to emit laser light may be used as the light source. In this embodiment, a laser diode (LD) 210 is used as the light source. In particular, the laser light source 210 enables more precise measurement than other kinds of light since laser light emitted from the laser light source 210 exhibits monochromaticity, linearity, and connectivity. For example, infrared light or visible light has great difference in measurement precision depending upon conditions, such as color and material, of an object as compared with laser light.

A light reception unit 22 may include an image sensor 220, on which a spot of light (L2 of FIGS. 4 and 5) reflected or scattered from an obstacle is formed. The image sensor 220 is an aggregate constituted by a plurality of unit pixels arranged in an m×n matrix. Each unit pixel may be embodied using a variety of light receiving elements, such as a cadmium sulfide cell (CdS), a photo diode, a photo transistor, a solar cell, and a photoelectric tube. Each of the light receiving elements converts an optical signal into an electrical signal. In addition, the light reception unit 22 may further include a light reception lens 230. The light reflected or scattered from the obstacle passes through the light reception lens 230, by which the light is refracted, and is then formed on the image sensor 220. The light reception lens 230 may include a plurality of lenses.

A base 23 supports the light transmission unit 21 and the light reception unit 22. The base 23 is rotatably provided at the cleaner body 10. The light transmission unit 21 and the image sensor 220 may be disposed on the base 23 such that the light transmission unit 21 and the image sensor 220 are spaced apart from each other by a predetermined distance.

Referring to FIGS. 4 and 5, the rotation drive unit 40 rotates the base 23. The rotation drive unit 40 may include a motor 41 to provide rotational force and a power transmission unit, such as a belt and a gear, to transmit the rotational force from the motor 41 to the base 23 such that the base 23 is rotated. The power transmission unit may include a pulley 42 connected to a rotary shaft of the motor 41 and a belt 43 disposed between the pulley 42 and the base 23 to transmit the rotational force from the motor 41 to the base 23. However, the present invention is not limited thereto.

Meanwhile, a supporter 25 to support the position sensor 20 may be further provided. The base 23 may be rotatably supported by the supporter 25. The supporter 25 may be fixed to the lower cleaner body part 11 using fastening members, such as screws or bolts.

A base cover 24 is coupled to the base 23 such that the base cover 24 can be rotated along with the base 23. Between the base cover 24 and the base 23 may be defined a light transmission path 21*a*, along which light emitted from the light transmission unit 21 passes, and a light reception path 22*a*, along which light to be received by the light reception unit 22 passes.

The controller 90 controls operations of the rotation drive unit 40 and the travel drive unit 60. According to embodiments, the controller 90 may also control other components, such as the light source 210 and the image sensor 220, of the robot cleaner 1. For example, the controller 90 may include a microcontroller unit (MCU) to process an electrical signal input from the image sensor 220. The controller 90 does not necessarily include one control unit. Generally, the robot cleaner 1 may include a plurality of control units to control the respective components of the robot cleaner 1. In this case, the controller 90 may be defined as some or all of the control units. The respective control units may be connected to one another electrically or in terms of signal transmission and reception. Spatial disposition of the respective control units is of no importance in defining the controller 90.

The transparent member 32 may be fixed to the cleaner body 10. The cleaner body 10 may be provided at the front thereof with an opening. The transparent member 32 may be fixed by a transparent member frame 31 mounted in the opening (see FIG. 9).

Figure 7:
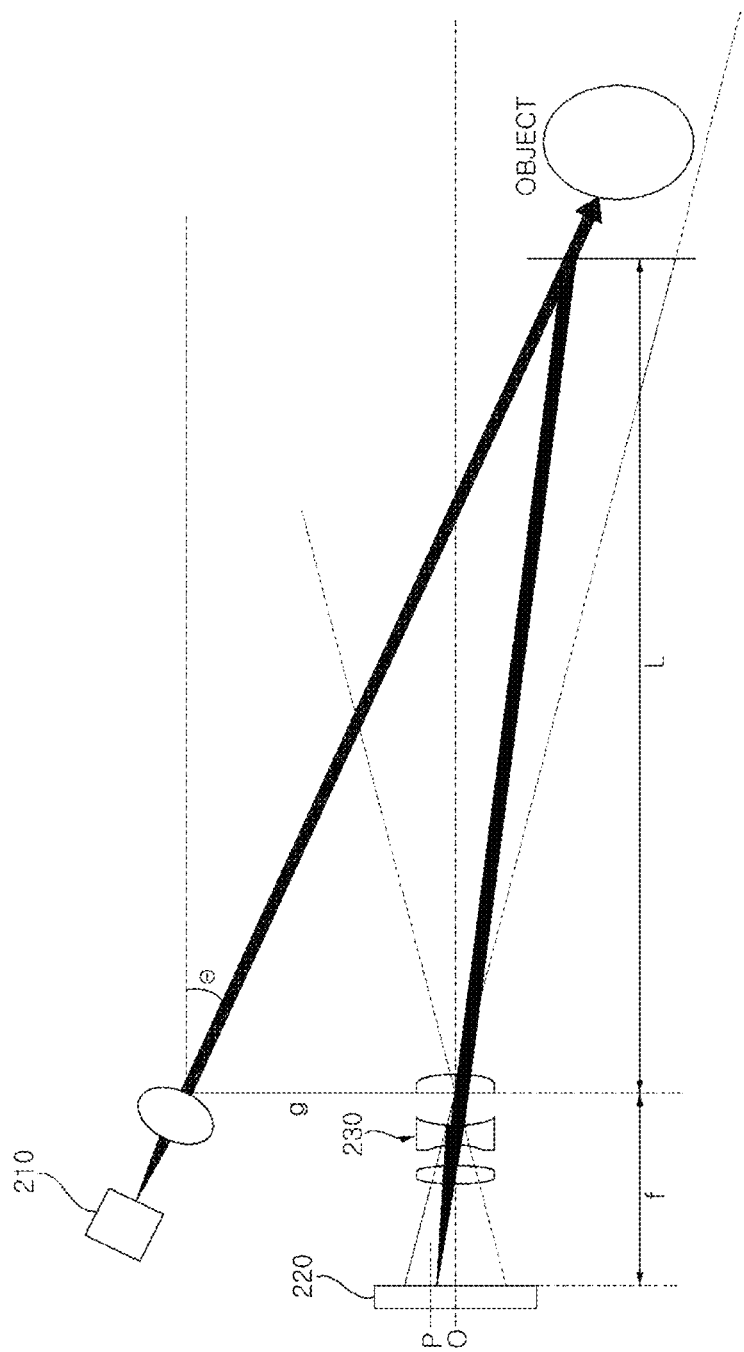
FIG. 7 is a view illustrating a principle of measuring the distance to an obstacle.
Figure 8:
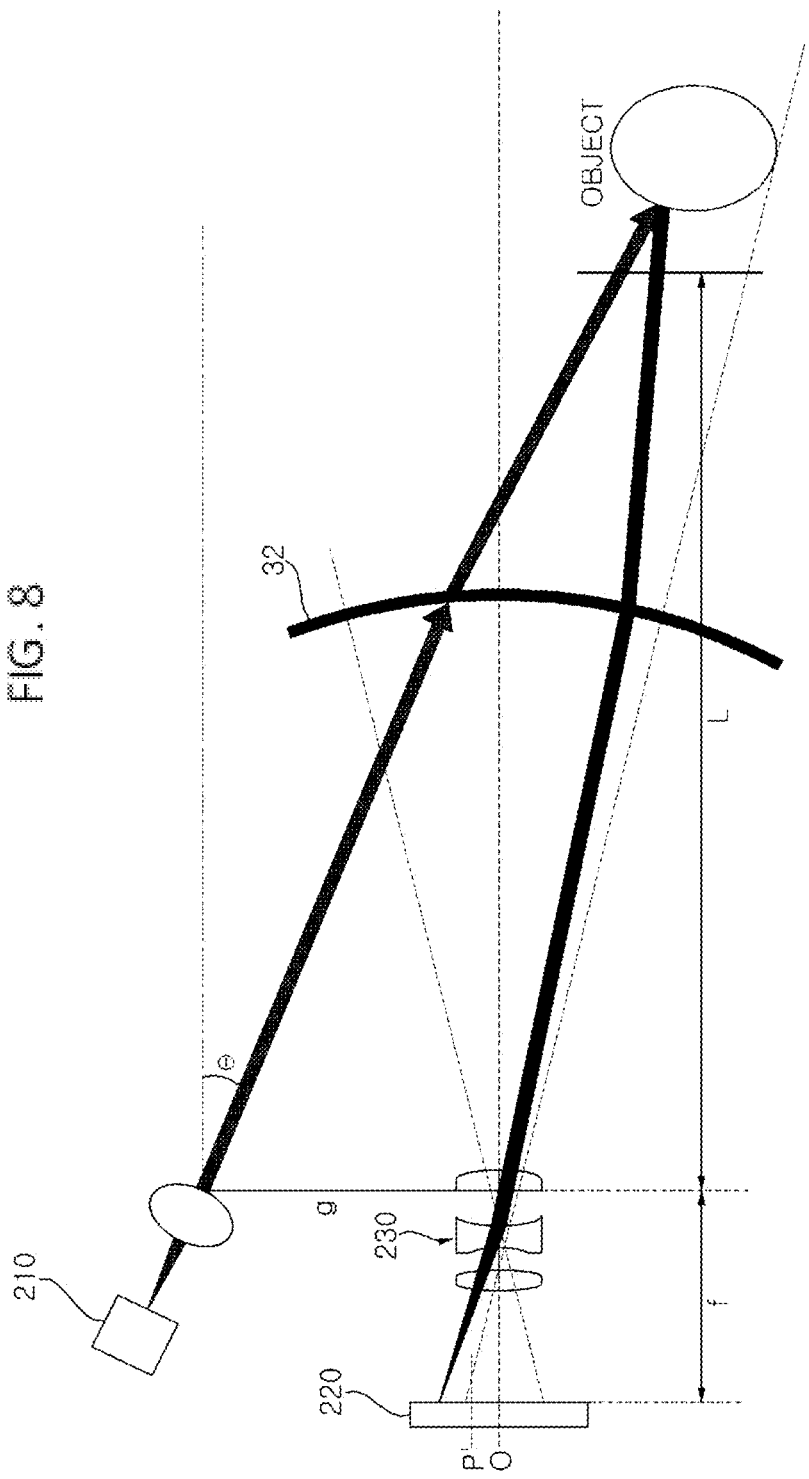
FIG. 8 is a view illustrating a principle in which an error occurs in the distance to the obstacle measured by the position sensor under the influence of a transparent member.

FIG. 7 is a view illustrating a principle of measuring the distance to an obstacle. FIG. 8 is a view illustrating a principle in which an error occurs in the distance to an obstacle measured by the position sensor under the influence of the transparent member.

Light emitted from the light source 210 has a predetermined angle $\theta$ to a main axis C of the light reception lens 230. In particular, the angle $\theta$ has a close relation with precision in measuring the distance to an object. If the angle $\theta$ is too small, it may be difficult to measure the distance to an object located at a short distance. If the angle $\theta$ is too large, on the other hand, it may be difficult to measure the distance to an object located at a long distance. For this reason, it is necessary for the angle $\theta$ to have an appropriate value. In particular, it is necessary for the angle $\theta$ to be set such that the angle $\theta$ does not have difficulty in measuring the distance to an object located at a distance of 0.1 m to 4 m.

The image sensor 220 is spaced apart from the light source 210 and the light reception lens 230 is disposed between the image sensor 220 and the object or an obstacle 300. On the assumption that the distance between the obstacle 300 and the light reception lens 230 is defined as an object distance L, the object distance L may be calculated by Equation 1 below.

$$L = \frac{-fg}{p - f\tan\theta} \qquad \text{[Equation 1]}$$

Where f is the focal distance, g is the distance between the light source 210 and the light reception lens 230, θ is an angle between light emitted from the light source 210 and the main axis C of the light reception lens 230, and p is the distance between a spot of light reflected or scattered from the object, formed on the image sensor 220, and the center o of the image sensor 220.

FIG. 8 is a view illustrating a principle in which an error occurs in the distance to an obstacle measured by the position sensor under the influence of the transparent member. Referring to FIG. 8, light emitted from the light transmission unit 21 or light reflected or scattered from the obstacle is refracted while passing through the transparent member 32. Such refraction of light has an influence on the position p' of the spot formed on the image sensor 220. As a result, an error (hereinafter, referred to as a measurement error) is generated between the distance to the obstacle measured by the position sensor 20 (hereinafter, referred to as the measured distance) and the real distance.

Figure 13:
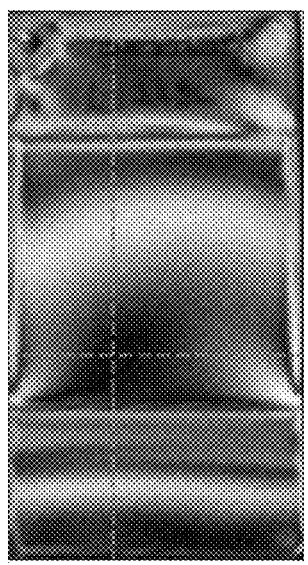
FIG. 13 is a view showing comparison in light transmission between a plate member (a) formed by injection molding and a plate member (b) formed by extrusion molding, showing that light distortion in injection molding is more serious than that in extrusion molding.
Figure 13:
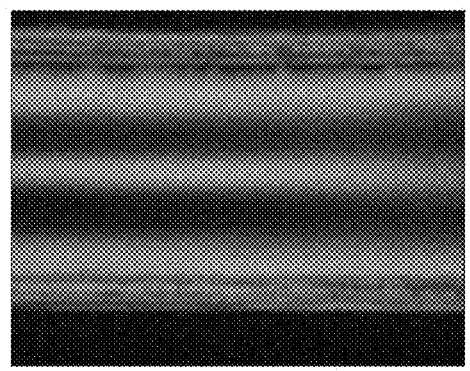

A method of forming the transparent member 32 in a curved shape may be considered to reduce such a measurement error. The measurement error is the smallest when light passes perpendicularly through the transparent member 3. In consideration of this fact, the transparent member 32 may be curved to reduce an incident angle of light (angle measured in a relationship with a normal line to a plane). From this point of view, coupling grooves 33a and 33b may include at least one curved section S2 and S3. The transparent member 32 mounted in the coupling grooves 33a and 33b may also be formed in a curved shape corresponding to the curved sections S2 and S3. In this case, the transparent member 32 may be formed in a curved shape by injection molding. In injection molding, however, it is difficult to form a thin film-shaped plate member and to solve a double refraction phenomenon. For this reason, it is preferable for the transparent member 32 to be formed by extrusion molding. In extrusion molding, a thinner plate member may be formed and distortion of light due to double refraction may be reduced as compared with injection molding. FIG. 13 is a view showing comparison in light transmission between a plate member (a) formed by injection molding and a plate member (b) formed by extrusion molding. It can be seen from FIG. 13 that light distortion in injection molding is more serious than that in extrusion molding.

Figure 9:
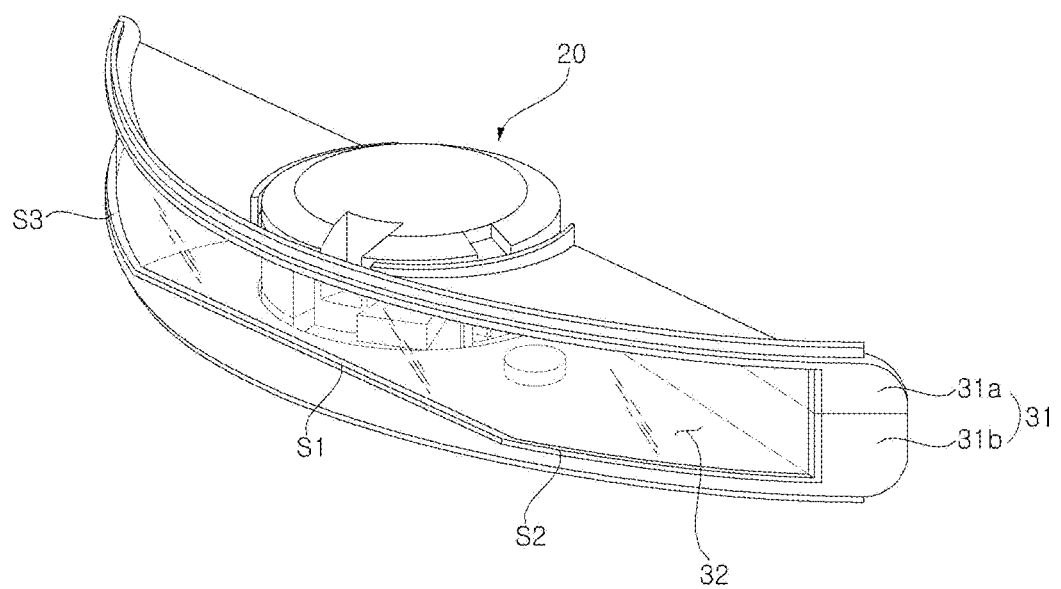
FIG. 9 is a partial view of the robot cleaner according to the embodiment of the present invention.
Figure 10:
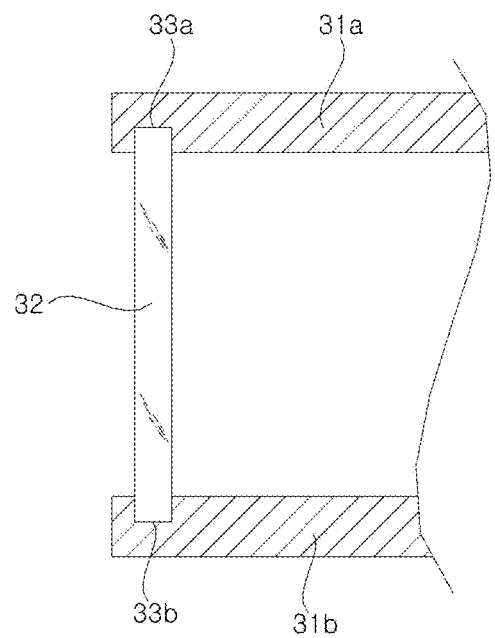
FIG. 10 is a view showing a structure in which the transparent member of FIG. 8 is mounted.

FIG. 9 is a partial view of the robot cleaner according to the embodiment of the present invention. FIG. 10 is a view showing a structure in which the transparent member of FIG. 8 is mounted. Referring to FIGS. 9 and 10, the transparent member 32 is formed of a transparent material that is capable of transmitting light emitted from the light transmission unit 21 and light to be received by the light reception unit 22. The transparent member 32 is disposed between an obstacle and the transmission unit 21 or between the obstacle and the light reception unit 22.

The transparent member frame 31 may include at least one coupling groove extending in the longitudinal direction of the transparent member 32 such that a long side of the transparent member 32 is inserted into the at least one coupling groove. The at least one coupling groove may include a pair of coupling grooves 33a and 33b, which are opposite to each other. Long sides of the transparent member 32 are inserted into the respective coupling grooves 33a and 33b. Of course, coupling grooves (not shown) may be further provided for interconnection between the coupling grooves 33a and 33b. Short sides of the transparent member 32 may be inserted into the coupling grooves (not shown).

The transparent member frame 31 may include a first frame member 31a and a second frame member 31b. The first coupling groove 33a and the second coupling groove 33b may be formed at the first frame member 31a and the second frame member 31b, respectively. In this structure, it is possible to easily mount the transparent member 32. For example, when the first frame member 31a and the second frame member 31b are coupled to each other in a state in which one long side of the transparent member 32 is inserted into the first coupling groove 33a, the other long side of the transparent member 32 may be inserted into the second coupling groove 33b.

Meanwhile, the transparent member frame 31 may include a receiving groove 34 depressed toward the transparent member 32 so as to surround the position sensor 20 such that the position sensor 20 is adjacent to the transparent member 32. The receiving groove 34 may be formed at least one selected from between the first frame member 31a and the second frame member 31b.

The transparent member 32 may be formed of a flexible material that can be deformed according to the shape of the coupling grooves 33a and 33b. As previously described, the transparent member 32 may be formed in a film shape by extrusion molding. Since the transparent member 32 is curved in response to the curved sections S2 and S3 of the coupling grooves 33a and 33b, it is possible to easily curve the transparent member 32 such that the transparent member 32 has a desired curvature.

The coupling grooves 33a and 33b may have a linear section S1. In this case, the curved sections S2 and S3 may be formed at opposite sides of the linear section S1. In a case in which the curved sections S2 and S3 are formed at opposite sides of the linear section S1 as described above, a flat surface portion of the transparent member 32, mounted in the coupling grooves 33a and 33b, corresponding to the linear section S1 faces the front of the cleaner body 10 and curved surface portions of the transparent member 32 corresponding to the curved sections S2 and S3 are formed at opposite sides of the flat surface portion of the transparent member 32 in a symmetric fashion. The curved sections S2 and S3 are curved such that concave surfaces of the curved surface portions of the transparent member 32 faces the light transmission unit 21 or the light reception unit 22.

Figure 11:
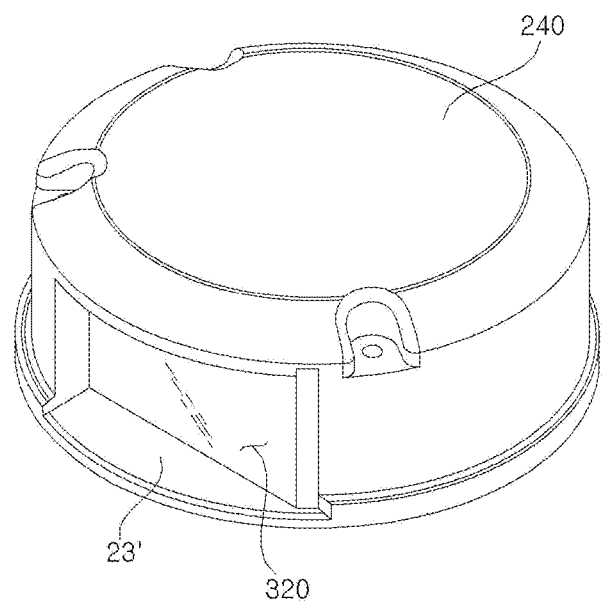
FIG. 11 is a view partially showing a robot cleaner according to another embodiment of the present invention.

FIG. 11 is a view partially showing a robot cleaner according to another embodiment of the present invention. Referring to FIG. 11, a transparent member 320 may be fixed by the position sensor 20. As previously described, the position sensor 20 may include a base 23' rotatably disposed at the cleaner body 10 to support the light transmission unit 21 and the light reception unit 22 and a base cover 240 to cover the base 23' such that the base cover 240 can be rotated along with the base 23'. In this case, the base cover 240 may be provided with an opening, in which the transparent member 320 is fixed. In FIG. 11, the transparent member 320 is flat. However, the present invention is not limited thereto. For example, the transparent member 320 may be curved as in the transparent member 32 according to the previous embodiment. In addition, the transparent member 320 may be formed by injection molding or extrusion molding. It is preferable for the transparent member 320 to be formed by extrusion molding since light distortion can be reduced.

Figure 12:
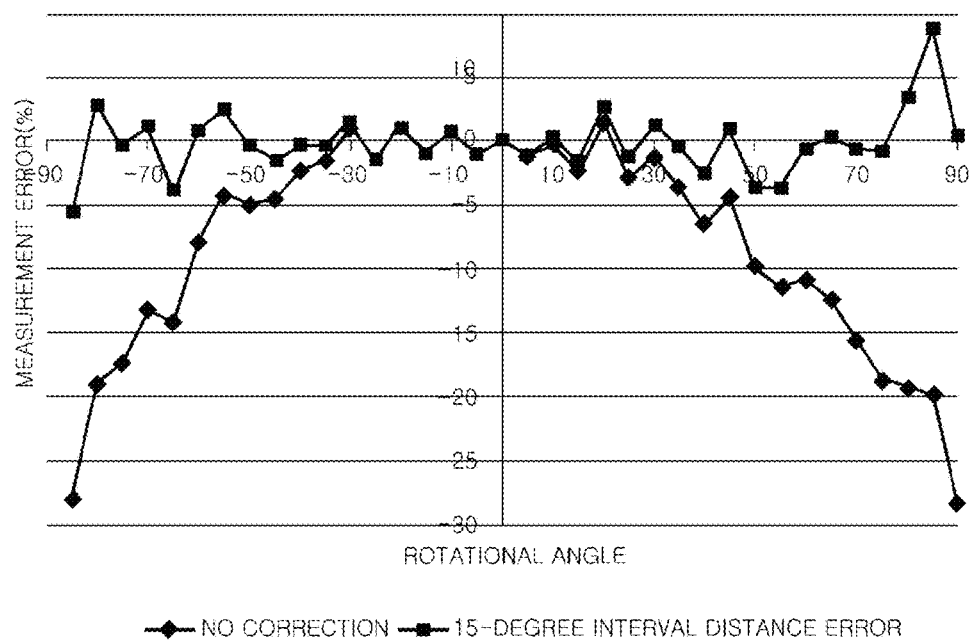
FIG. 12 is a graph showing a measurement error generated per rotational angle of a base of the robot cleaner of FIG. 1 and correction results of the measurement errors.

FIG. 12 is a graph showing a measurement error generated per rotational angle of the base of the robot cleaner of FIG. 1 and correction results of the measurement errors. Referring to FIG. 12, the controller 90 may correct the measured distance sensed by the position sensor 20 based on the real distance to an object assumed to be located at the same distance from the position sensor 20.

Since an incident angle of light upon the transparent member 32 is changed depending upon a rotational angle of the base 23, a measurement error is changed depending upon the rotational angle of the base 23.

In the graph of FIG. 12, the front of the robot cleaner 1 is shown as having an angle of 0 degrees, a rotational angle in the left direction is shown as having a negative (−) value, and a rotational angle in the right direction is shown as having a positive (+) value.

The measured distance is the distance to an object located at the same distance from the robot cleaner 1 per predetermined rotational angle (e.g. 15 degrees). As the rotational angle increases, a measurement error also increases. The measurement error is less than 5% within a rotational angle range of about 30 degrees. In this case, the measured distance is very approximate to the real distance. As the rotational angle increases, however, a measurement error is not negligible. For this reason, it is necessary to correct the measured distance.

The measured distance may be corrected by estimating a tendency in change of measurement error values based on the rotational angle from an equation calculated by interpolating measurement error values acquired per rotational angle. For example, on the assumption that this graph has coordinates (x, y) having rotational angles as an x axis and measurement errors at the respective rotation angles as a y axis, a measurement error y corresponding to each rotation angle may be calculated.

$y=$[(the position of the spot formed on the image sensor 220 without the transparent member 32)−(the position of the spot formed on the image sensor 220 with the transparent member 32)]/the position of the spot formed on the image sensor 220 without the transparent member 32

Various methods of calculating a function that is capable of estimating values between such coordinate values using the coordinate values are well known. For example, as can be seen from FIG. 12, when the rotational angle increases, an uncorrected measurement error also increases. Consequently, a quadratic or more polynomial equation may be simply used as an interpolation function to correct such an error. However, the present invention is not limited thereto. For example, various functions, such as a logarithmic function and an exponential function, may be used.

On the other hand, interpolation functions may be defined per distance to an object since such a measurement error can be previously acquired through experiments. The controller 90 may correct the position of the spot formed on the image sensor 220 per rotation angle based on the interpolation functions, thereby obtaining a value more approximate to the real distance.

Meanwhile, a control method of the robot cleaner according to the present invention may be realized as code, which is readable by a processor included in the robot cleaner, in recording media readable by the processor. The recording media readable by the processor includes all kinds of recording devices to store data which are readable by the processor. Examples of the recording media readable by the processor may include a read only memory (ROM), a random access memory (RAM), a compact disc read only memory (CD-ROM), a magnetic tape, a floppy disk, and an optical data storage device. In addition, the recording media readable by the processor may also be realized in the form of a carrier wave, such as transmission through the Internet. Furthermore, the recording media readable by the processor may be distributed to computer systems connected to each other through a network such that a code readable by the processor is stored or executed in a distribution mode.

As is apparent from the above description, the robot cleaner according to the present invention has the effect of preventing the position sensor from being contaminated by a contaminant, such as dust.

In addition, the robot cleaner according to the present invention has the effect of preventing the precision component, such as the lens constituting the light transmission unit or the light reception unit, from being scratched or broken and thus permanently damaged, whereby durability of the robot cleaner is improved and, in addition, accuracy in detecting an obstacle is improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A robot cleaner comprising:
  a cleaner body provided with an opening;
  a position sensor disposed in the cleaner body, the position sensor comprising a light transmission unit to emit light, a light reception unit to receive light reflected or scattered from an obstacle after being emitted from the light transmission unit and a base which supports the light transmission unit and the light reception unit and is rotatable about the cleaner body;
  a transparent member to transmit the light emitted from the light transmission unit and the light to be received by the light reception unit; and
  a transparent member frame mounted in the opening to fix the transparent member, wherein
  the transparent member frame comprises a coupling groove extending in a longitudinal direction of the transparent member, in the coupling groove is inserted the transparent member, wherein,
  the coupling groove comprises a linear section and a first curved section and a second curved section, wherein the first curved section and the second curved section are formed at opposite sides of the linear section, respectively, and the transparent member is formed of a flexible material deformable according to a shape of the coupling groove,
  wherein the light emitted from the transmission unit is incident on a first curved surface portion of the transparent member corresponding to the first curved section, a flat surface portion of the transparent member corresponding to the linear section or a second curved surface portion of the transparent member corresponding to the second curved section according to a rotation of the base.

2. The robot cleaner according to claim 1, wherein the transparent member includes a first longitudinal edge and a second longitudinal edge and a third longitudinal edge, wherein the second longitudinal edge and the third longitudinal edge are disposed on opposite sides of the first longitudinal edge, and the first longitudinal edge is inserted into the linear section, the second longitudinal edge is inserted into the first curved section and the third longitudinal edge is inserted into the second curved section.

3. The robot cleaner according to claim 2, wherein
the coupling groove comprises a first coupling groove and a second coupling groove, and the transparent member frame comprises a first frame member and a second frame member, at which the first and second coupling grooves are formed, respectively,
wherein the first frame member and the second frame member are coupled to each other in a state in which the first longitudinal edge of the transparent member is inserted into the linear section and the second longitudinal edge of the transparent member is inserted into the first curved section and the third longitudinal edge of the transparent member is inserted into the second curved section.

4. The robot cleaner according to claim 2, wherein the transparent member is deformed according to a shape of the linear section and the first and second curved sections.

5. The robot cleaner according to claim 4, wherein each concave surface of the first curved section and second curved sections faces the light transmission unit or the light reception unit.

6. The robot cleaner according to claim 1, wherein the curved sections are symmetrically disposed.

7. The robot cleaner according to claim 1, wherein the transparent member frame comprises a receiving groove depressed toward the transparent member so as to surround the position sensor such that the position sensor is adjacent to the transparent member.

8. The robot cleaner according to claim 1, wherein the transparent member is fixed by the position sensor.

9. The robot cleaner according to claim 8, wherein the position sensor comprises:
a base rotatably disposed at the cleaner body to support the light transmission unit and the light reception unit; and
a base cover to cover the base such that the base cover is rotated along with the base, and
the base cover is provided with an opening, in which the transparent member is fixed.

10. The robot cleaner according to claim 1, wherein the transparent member is formed by extrusion molding.

11. The robot cleaner according to claim 1, wherein the transparent member is a plate-shaped film.

12. The robot cleaner according to claim 1, further comprising a controller configured to calibrate a distance to an object sensed by the position sensor based on a predetermined distance to the object.

13. The robot cleaner according to claim 12, wherein
the light reception unit comprises an image sensor, on which a spot of the light reflected or scattered from the obstacle is formed, and
the controller is configured to correct a position of the spot per rotation angle of the base based on a difference between the predetermined distance and the distance sensed by the position sensor and calculates a distance to the obstacle based on the corrected position.

* * * * *